United States Patent [19]

Ljusberg-Wahren

[11] Patent Number: 4,957,511

[45] Date of Patent: Sep. 18, 1990

[54] COAL-WATER DISPERSION AGENT

[75] Inventor: Helena Ljusberg-Wahren, Soderhamn, Sweden

[73] Assignee: Bergvik Kemi AB, Sweden

[21] Appl. No.: 590,830

[22] Filed: Mar. 19, 1984

[30] Foreign Application Priority Data

Mar. 18, 1983 [SE] Sweden ................................ 8301502

[51] Int. Cl.$^5$ ................................................ C10L 1/32
[52] U.S. Cl. ..................................... 44/51; 252/311.5; 252/354; 252/356; 260/404
[58] Field of Search ................... 260/404, 97.5; 44/51, 44/61, 62, 66, 70; 252/354, 356, 311.5

[56] References Cited

U.S. PATENT DOCUMENTS

| | | | |
|---|---|---|---|
| 3,617,095 | 11/1971 | Lissant ............................ | 71/DIG. 1 |
| 3,632,822 | 1/1972 | Conroy ............................. | 260/97.5 |
| 4,360,615 | 11/1982 | Wang et al. ........................ | 260/97.5 |

*Primary Examiner*—Bruce D. Gray
*Attorney, Agent, or Firm*—Pollock, Vande Sande & Priddy

[57] ABSTRACT

A dispersing agent for solid particles in water, which is a tall oil pitch partially esterified with a polyalkylene glycol mainly composed of ethylene oxide units of a molecular weight of above 600 or a monoester or monoether thereof and optionally also aminated having a residual acid value higher than 3, and a process for preparing said dispersing agent which comprises heating the two reactants at 200°–285° C. for so long that the maximum acid value of the reaction mixture at this temperature is reduced at least 2 units. The dispersing agent can be used to disperse coal particles in water.

15 Claims, No Drawings

COAL-WATER DISPERSION AGENT

The present invention relates to a dispersion of coal particles in water wherein the dispersing agent is based on tall oil pitch.

Tall oil pitch is produced as a residue in the distillation of crude tall oil, a by-product of the kraft or sulfate pulping process. Tall oil pitch is a viscous, tarry material consisting of a mixture of different free and combined rosin acids, fatty acids and derivatives thereof and an unsaponifiable portion. Efforts have been made to find different fields of use for the pitch, for instance as a component in rubber and plastic material or in insulating masses and the like, but the main part normally is burned.

Bare uncharged particles of a colloidal size, that is smaller than 0.1 μm, as well as larger particles, so called coarse disperse particles, have a tendency to agglomerate when being dispersed in a liquid phase forming particle aggregates. This can be prevented in accordance with known principles, e.g. by sterical stabilizing or electrostatical stabilization of the particles. It has long been known that the best polymers for sterical stabilization by means of polymer adsorption to the particle surface should comprise one part having a high affinity to the dispersion medium and another part being attracted to the particle. It is also known that the addition of substances having ionic groups increases the stability of the dispersion by electrical double layer repulsion. For larger particles, which settle under the influence of gravity, a control of sedimentation is also required. A formation of a dense sediment which is difficult to redisperse can make a dispersion unfit for any practical use.

In U.S.-A- No. 4 358 293 there is disclosed a dispersion of coal particles in water, wherein as dispersing agent is used a nonionic surfactant polyalkyleneoxide compound having a hydrophobic portion of a hydrophilic portion, and wherein the hydrophilic portion comprises at least 100 units of ethylene oxide.

It is also known from the WO patent application No. 83/00500 to disperse coal particles in water by means of several different additives, such as a tenside which is absorbed to the particle surface causing repulsion between the particles, and interacting hydrophilic polymers which are supposed to provide sterical hindrance.

It has now been found that a reaction product well suited as a dispersing agent for solid particles in water is obtained by esterification of tall oil pitch with polyalkylene glycol. The dispersing agent of the invention is characterized in that it is a tall oil pitch partially esterified with a polyalkylene glycol mainly composed of ethylene oxide units of an average molecular weight of above 600 or a monoester or monoether thereof having a residual acid value higher than 3.

The dispersing agent of the invention, which comprises polyalkylene glycol chains as well as ionic groups bound to tall oil pitch is in water supposed to function by means of both electrostatical and sterically repulsive forces. The reaction product has hydrophobic portions of natural product origin to which hydrophilic groups are bound, viz. hydroxy, carboxylic acid groups, and soaps thereof, and polyalkylene glycol chains. The reaction product will in aqueous solution be absorbed to the solid particles by the hydrophobic portion of the pitch, from which the polyalkyeleneglycol chains protrude into the dispersion medium, that is the water, and give a sterical protection.

It is essential that the residual acid value of the product obtained is higher than 3, that is that there will remain a sufficient number of free carboxylic acid groups in the pitch after the reaction, as these groups contribute to the electrostatic repulsion between the particles to be dispersed. Products having a residual acid value below and about 3 have inferior characteristics compared to the corresponding products having a higher residual acid value. The optimum residual acid value for a certain mixture ratio is dependent on the reduction of the acid value of the reaction mixture and the acid value of the starting pitch.

As a starting material can be used tall oil pitch with an acid value, depending on the process of preparation, of between 20 and 75 approximately, normally between 25 and 55. If the acid value is too low carboxylic acid groups can be added, for instance by means of maleic acid anhydride by a Diels-Alder reaction.

It is preferable that the tall oil pitch used as a starting material has a high viscosity, as the dispersion of solid particles in water will then get a better storage stability than when using a lower viscosity pitch. The tall oil pitch may be polymerized before the step of esterification to obtain a higher viscosity. The viscosity of the tall oil pitch can, if being too low, be increased by any known process, for instance by heating in the presence of oleum or by airblowing in the presence of a Lewis acid, such as $BF_3$.

The characteristics of the tall oil pitch will mainly depend on the composition of the wood feed stock for the pulping process, the process parameters in the pulping factory and the conditions for distilling of the crude tall oil and acidulation of the tall oil soap. As stated above the pitch contains low-volatile neutral substances, such as esters, hydrocarbons and hydroxy containing compounds, such as sterols, phenolic compounds and aliphatic alcohols, as well as high boiling rosin acids and fatty acids, and condensation, oxidation and decomposition products thereof. Finally there is a small part of low molecular free acids, mainly rosin acids.

Tests have shown that tall oil pitch of different origins and of different compositions will result in dispersing agents of the invention of fairly uniform dispersing characteristics.

The polyalkyleneglycol used in the esterification is mainly composed of ethylene oxide units, as it is essential that it is hydrophilic. A monoester or a monoether thereof can also be used. As examples of monoesters can be mentioned esters of carboxylic acids of the type R—COOH, wherein R is a hydrocarbon radical of 1–19 carbon atoms, preferably 1–4 carbon atoms, such as acetic acid, propionic acid, butyric acid, carbonic acid, caprylic acid, pelargonic acid, palmitic acid, stearic acid, oleic acid, linoleic acid or mixtures thereof, such as tall oil fatty acid and soya fatty acid. Monoethers of polyalkylene glycol are alkyl ethers, wherein the alkyl group can have 1–20 carbon atoms, preferably 1–5 carbon atoms. As an example can be mentioned monoethers or polyethylene glycol of the formula R—O—$(CH_2CH_2O)_n$—$CH_2$—$CH_2$—OH, wherein R is alkyl of 1–5 carbon atoms and n is a number $\geq 12$. For economical reasons polyethylene glycol is however preferred.

The molecular weight of the polyalkylene glycol is also of importance. For the effect of the dispersing agent to be pronounced the polyalkylene glycol should have a molecular weight above 600. A molecular weight of 4000-14000 will give a dispersion of coal particles in water having a low viscosity, whereby a higher molecular weight will decrease the tendency to settle and aggregate in comparison with a lower molecular weight. Still higher values of the molecular weight might be applicable.

The partially esterified pitch can, if desired, be aminated by reaction with a polyamine or an alkanolamine, whereby the reaction has to be stopped, in order that the residual acid value will not be below 3. An introduction of amino groups into the partially esterified pitch has turned out to give a positive effect on the dispersing of coal particles in water. Polyamine in this context also includes diamines and mixtures of different amines. As examples can be mentioned ethylene diamine, diethylene triamine, aminoethyl ethanolamine, aminoethyl piperazine, piperazine, triethylene tetramine, higher polyethylene polyamines, ethanolamine, diethanolamine, triethanolamine or mixtures of two or more thereof, such as "Berolamine 20", a mixture of polyethylene amines and high boiling alkanolamines which can be provided from Berol Kemi AB.

For the preparation of a dispersing agent of the invention tall oil pitch is heated with a polyalkylene glycol mainly composed of ethylene oxide units of an average molecular weight of above 600 or a monoester or monoether thereof at a temperature of 200°-285° C. for sufficiently long that the maximum acid value of the reaction mixture at this temperature is reduced by at least 2 units.

Tall oil pitch and polyalkylene glycol can be reacted in a ratio of 10:90 to 70:30, preferably 30:70 to 50:50 by mixing and heating. A larger content of pitch will give a less expensive product.

The optional subsequent reaction with a polyamine or an alkanolamine is performed at a temperature and for a period of time which depends on the amine used. This reaction normally takes place at 170° C.

If polyethylene glycol is used as a reactant the reaction can be proceeded at the stated temperature for 1-12 h, dependent on the molecular weight of the starting materials and the residual acid value desired. The reaction can occur at a lower temperature, from 160° C., but then an extended reaction time is required. During the heating of the reaction mixture a small initial increase in acid value can sometimes be noticed before the subsequent reduction thereof. The above mentioned reduction in acid value should therefore be related to the maximum value obtained.

The reaction of polyethylene-glycol and tall oil pitch is easy to perform on a large scale and the product obtained can be supplied in solid state or conveniently as a concentrated aqueous dispersion of a dry matter content of up to about 40 percent by weight.

The dispersing agent of the invention can be used for dispersing coal particles in water for preparation of a coal-water slurry having a high coal content of >70% and such properties that it can be used as a fuel. The dispersing agent is then used in an amount of 0.1-5%, preferably 0.3-1%, based on the total weight of the dispersion.

Various methods to prepare and stabilize coal-water slurries have been suggested. The reason for this is that slurries of a high coal content make possible transport and combustion of coal in liquid form. By this a less risky and more environmentally adapted handling is achieved compared to the handling of dry, solid coal. To make the coal-water slurry fluid at the concentration ranges in question chemicals have to be added. The object is thus to balance a high coal content, good flowability, that is a low viscosity, a low tendency to settle and optimum combustion characteristics. At a higher viscosity the time for formation of a sediment will normally be longer. To obtain a useful product there has previously been required several different types of additives. Prior used dispersing agents make the preparation of a dispersion of pulverized coal in water which can be pumped more expensive and thereby the use of the new technique more difficult. By means of the dispersing agent of the invention, a polyalkylene glycol ester of tall oil pitch comprising varying amounts of ionic groups, such a chemical can be produced at a low price, which is of great importance for a commercial utilization of coal-water slurries. Another advantage in this connection is that the tall oil pitch is classified as a low sulphur content fuel of a high thermal value.

In the system dispersing agent-water the pH value is of great importance for the characteristics of the mixture. Addition of alkali to an aqueous dispersion of the present dispersing agent will give a coal-water slurry an improved storage stability. This indicates that electrostatical, repulsive forces are acting in the system. A too large addition of alkali will, however, bring about an undesirable increase of viscosity. As the dispersing agent of the invention is not stable against hydrolysis the pH value of an aqueous dispersion should not be below 2 or above 10; the pH value generally should be within the range 5-10.

The flowability and stability of the coal-water slurry depend in addition to the type of dispersing agent and the amount thereof and the amount of coal in the mixture. The particle size of the coal also is of importance for the dispersion. A bimodal size distribution of the coal particles will make it possible to disperse considerably larger amounts of coal than a homogeneous size distribution. The dispersing is also affected by the surface properties of the coal, that is the type of coal.

A dispersing agent of the invention based on tall oil pitch shows a distinctly improved dispersing effect for coal particles in water compared to conventional tensides, such as with polethylene glycol esterified fatty acid. Tall oil pitch has also been ethoxylated by methods known per se and the reaction product obtained was found to have inferior dispersing properties compared to tall oil pitch esterified with polyethylene glycol. The present dispersing agent also has defoaming characteristics. This can be ascribed to the effect of the polar neutral substances of the pitch, such as sterols, higher alcohols, phenolic substances and esters.

Different additives can be used together with the dispersing agent for instance polysaccharides, such as xanthan gum to improve the stability of the dispersion.

The invention is described in more detail in the following examples, in which the stated percentages and proportions are based on the weight.

To keep the quality of the coal as well defined as possible in estimating the dispersing agent in these examples one single type of coal has been utilized for the preparation of coal-water mixtures, viz. a Czechish, bituminous coal of a low sulphur content. The particle size of the coal is mainly within the range 1-200 μm.

The dispersing characteristics of the reaction products prepared in examples 1-3 have been determined in the same way as the oil value for pigment (SIS 17 61 05);

the given value however defines the amount of coal particles which can be dispersed into a free flowing product. The following procedure is used: 1 g coal is weighed on a blasted glass plate. Water comprising 3% dispersing agent is added. The amount of aqueous phase which has to be added to make the coal slurry free flowing in working the pulverized coal with a spatula is noted. The accuracy is ±0.5%.

The flow properties and the stability of the coal-water mixture (CWM), which are critical for the pumpability and storage durability thereof, are inter alia dependent on the way in which the mixture has been prepared. To obtain reproducible CWM-tests the following procedure has been used in examples 4-9:

The dispersing agent is swelled in water of 80° C. and then homogenized in an Ultraturrex mixer. Alkali is then added if desired. This liquid is added in portions to the pulverous coal, which consists of sieved particles which have passed through a mesh opening of 250 μm. The premixed CWM sample is disintegrated in a dissolver at 2000 r/min for 20 minutes.

The viscosity of these CWM samples was measured in a Brookfield viscosimeter, type LVF, spindle No. 3 at 30 r/min. By this the apparent viscosity is obtained. The storage stability was measured by means of the following penetration test which discloses tendencies for aggregation and/or sedimentation in the CWM sample. A glass rod (2 g, $\phi$ 1.7 mm) is allowed to fall to the bottom in a CWM sample of a volume of 100 ml and a height of 173 mm and the time required is measured.

The influence of the viscosity of a newtonian fluid on the time for penetration was examined by means of two different solutions of glycerol:

| | |
|---|---|
| $\eta = $ 1040 mPa.s | time for penetration 4 s |
| $\eta = $ 612 mPa.s | time for penetration 2.5 s |

EXAMPLE 1

Reaction I

Tall oil pitch (acid value 38) 260 is charged in a 1000 ml reactor provided with a gas inlet tube for protective atmosphere, a mechanical stirrer, a thermoelement and a column with a column packing of porcelain connected to a receiver for the collection of reaction water. The pitch is heated to about 100° C. and melted polyethylene glycol, 390 g, (mol. weight 4000) is added. The temperature of the reactor is raised to 280° C. by means of a heating jacket and maintained at this temperature for 2 h 15 min. The acid value of the reaction mixture is then 10.

Reaction II

The temperature of the reaction mixture I is lowered to 170° C. and aminoethyl ethanolamine ($H_2N$—$C_2H_4$—$NH$—$C_2H_4$—$OH$), 12.4 g, is added. The reaction is maintained at this temperature for 1.5 h whereupon the acid value is 5.

Reaction III

Pure polyamines can also be used. If to the product of the reaction I is added piperazine, 21 g, a product having a residual acid value of 5 can be obtained at 140° C.

The reaction products obtained by the reactions I to III were transferred into 3% aqueous dispersions, which were tested with regard to their ability to disperse coal. For comparison distilled water and non reacted tall oil pitch neutralized with NaOH were also tested. The results are given in the table below.

| Dispersing agent | % coal in the slurry |
|---|---|
| — | 48 |
| Neutralized tall oil pitch | 58 |
| Tall oil pitch derivative of the reaction I | 65 |
| Tall oil pitch derivative of the reaction II | 68 |
| Tall oil pitch derivative of the reaction III | 66 |

EXAMPLE 2

In order to investigate the effect of the molecular weight of the polyethylene glycol on the ability to disperse coal particles in water, different reaction products of tall oil pitch and polyethyleneglycol in a ratio of 30:70 were prepared. The molecular weight of the polyethylene glycol was between 600 and 10 000 and the residual acid value of the product obtained was in the range of 5-7. The results, given in the table below, indicate a clearly inferior dispersing ability for a product prepared by using a polyethyleneglycol having a molecular weight of 600.

| Polyethylene glycol mol.weight. | % coal in the slurry |
|---|---|
| 600 | 58 |
| 2000 | 63 |
| 3000 | 66 |
| 6000 | 68 |
| 10000 | 64 |

EXAMPLE 3

The viscosity of a coal-water slurry containing 64% coal and 1% dispersing agent was determined on an Emila rotation viscosimeter with measuring system II (from Reciprotor A/S; Denmark). As dispersing agent was used a reaction product with different acid values, obtained from polyethyleneoxide of a molecular weight of 3000 and tall oil pitch of an acid value 38. The results are given in the following table.

| Acid value of the reaction product | Viscosity, mPa.s |
|---|---|
| 5 | 350 |
| 3 | 550 |

A residual acid value of 3 will thus make the coal-water slurry more viscous and more difficult to pump.

EXAMPLE 4

The addition of alkali to a CWM sample increases the storage stability thereof.

A 1 kg reactor provided with a stirrer, a thermometer and a receiver for collecting reaction water is charged with 350 g tall oil pitch (acid value=30 mg KOH/g sample) and 350 g polyethyleneglycol of a molecular weight of 8000. The reaction is kept at 280° C. for 1 h and the product obtained shows an acid value of 14.

This product is dispersed in water and mixed with pulverized coal in an amount giving a final ratio of 70% coal, 0.5% additive and the remainder water. This CWM has an apparent viscosity of 250 mPa.s, but a hard, solid cake is formed after storage for 12 days.

The addition of sodium hydroxide will give an improved storage stability. After storage for 12 days no sediment has formed on the bottom and the time for penetration amounts to 7 s.

0.1 N NaOH is added to a mixture of dispersing agent with water up to the pH value stated in the table below. A CWM is then prepared and the apparent viscosity is measured.

| Dispersing agent in water pH value | Apparent viscosity, mPa.s for CMW | |
|---|---|---|
| | after shearing for 15 s | after shearing for 5 min. |
| 5* | 250 | 250 |
| 7 | 260 | 230 |
| 9.5 | 240 | 220 |
| 10.5 | 260 | 230 |

*no addition of NaOH

EXAMPLE 5

The dispersing agent can be produced in a semitechnical scale. To a reactor of stainless steel, provided with indirect steam heating and electrical heating, a stirrer and a thermoelement for measurement of temperature, is charged 35 kg polyethylene glycol (molecular weight 8000) which is melted at 80°–90° C. and then 15 kg hot (95° C.) tall oil pitch (acid value 37, rosin content 12%, viscosity 50° C. =1700 mPa.s). The temperature is raised for 2 h to 270° C. at atmospheric pressure and maintained at this temperature under stirring for 3.5 h. The acid value of the final product obtained is 11. The final reaction product can be tapped directly in containers without further handling. Alternatively hot water can be added to the still hot (80°–100° C.) reaction product while stirring in order to get a dry matter content of 35%. The obtained product can then be diluted with cold water to the desired concentration.

EXAMPLE 6

Dispersing agents were prepared from tall oil pitch of different origin and consequently of various composition. 30% tall oil pitch was reacted with 70% polyethylene glycol (molecular weight 8000) at 280° C. for 2–3 h. From this product a 70% coal water mixture containing 0.5% additive was prepared. From the table below stating the characteristics of the pitches and the properties attained is evident that pitches of different composition all give useful dispersing agents, being capable of producing a free flowing dispersing of a coal content of 70%. It is also shown that an increased viscosity of the tall oil pitch reduces the tendency to aggregate and sediment.

| Sample no. | Tall oil pitch | | | CWM | pene- |
|---|---|---|---|---|---|
| | from | viscosity mPa.s at 50° C. | acid value | rosin content % | apparent viscosity mPa.s | tration time after 5 d s |
| 1 | USA | 7 000 | 38 | 14 | 340 | |
| 2 | Norway | 4 200 | 47 | 18 | 250 | |
| 3 | Finland | 1 650 | 28 | 6 | 290 | |
| 4 | Sweden | 7 200 | 24 | 7 | 280 | |
| 5 | " | 2 000 | 54 | 19 | 260 | |
| 6 | " | 1 700 | 50 | 17 | 300 | |
| 7 | " | 1 600 | 44 | 14 | 440 | |
| 8 | " | 1 700 | 37 | 12 | 260 | |
| 9 | " | 2 000 | 30 | 9 | 340 | <60 |
| 10 | " | 5 900* | | | 280 | 24 |
| 11 | " | 7 750** | | | 330 | 38 |
| 12 | " | 17 000** | | | 320 | 19 |

*The viscosity of the starting pitch has been increased by heating the pitch of sample 9 in the presence of oleum.
**The viscosity of the starting pitch has been increased by air blowing and heating.

EXAMPLE 7

The size of the polyethylene glycol chain affects the properties of a tall oil pitch-polyethylene glycol as a dispersing agent.

70% coal-water mixtures containing 0.5% dispersing agent have been prepared with different dispersing agents based on a 30:70 mixture of tall oil pitch and polyethylene-glycol of different molecular weight (600–20000) which has been reacted for 2–4 h at 280° C. A monomethyl polyethylene glycol having a molecular weight of 5000 has also been tested. In the table below the viscosity values of the respective CWM samples obtained are stated for the corresponding molecular weight.

| polyethylene glycol molecular weight | Viscostiy of CWM mPa.s |
|---|---|
| 600 | — |
| 1000 | 2100 |
| 2000 | 640 |
| 3000 | 490 |
| 4000 | 510 |
| 4600 | 340 |
| 5000* | 360 |
| 6000 | 300 |
| 8000 | 260 |
| 10000 | 450 |
| 14000 | 290 |
| 20000 | 1050 |

*polyethylene glycol monomethylester

EXAMPLE 8

The ratio between tall oil pitch and polyethylene glycol can be varied and still give a reaction product with dispersing properties. The dispersing ability of the product is strongly dependent on the reaction time.

Polyethylene glycol (molecular weight 8000) and tall oil pitch were reacted in different ratios at 280° C. until the acid value of the mixture had been reduced 2–3 units. 70% coal-water mixtures containing 0.5% of the dispersing agent produced were prepared and the viscosity measured. The results are given in the table below

| Tall oil pitch: Polyethylene glycol ratio | Reaction time h | CWM viscosity mPa.s |
|---|---|---|
| 15:85 | 6 | 420 |
| 20:80 | 6 | 330 |
| 30:70 | 2 | 240 |
| 50:50 | 1 | 240  240* |
| 60:40 | 2 | 1270  610* |

EXAMPLE 9

Reaction products based on polyethylene glycol and tall oil pitch, fatty acid, rosin acid and polymer fatty acid respectively, have been prepared and their dispersing ability tested. 30% acid containing product was reacted with 70% polyethylene glycol (molecular weight 8000) until approximately the same amount of OH groups had been reacted (a reduction of the acid value of 3–4 units). A 70% coal-water mixture containing 0.5% of the respective reaction product was then prepared. In addition to the viscosity values obtained the change of volume of the CWM samples are stated in the table below.

| based on | CWM mPa.s | reduction of volume % |
|---|---|---|
| Tall oil pitch | 256 | 1 |
| Fatty acid* | 540 | 15 |
| Rosin acid | 3068 | — |
| Polymer fatty acid** | 408 | — |
| Ethoxylated tall oil pitch, weight ratio pitch:polyethyleneoxide 35:65 | non fluent | — |

*Tall oil fatty acids, a mixture of fatty acids, mainly $C_{18}$.
**Fatty acid polymerized by means of $BF_3$.

The volume of a CWM with a dispersing agent based on tall oil pitch will remain approximately constant in contrast to the volume of CWM of a dispersing agent based on fatty acid or a polymer fatty acid.

It is worth noticing that tall oil pitch treated with ethyleneoxide gives a product which when added in an amount of 1% to CWM gives an apparent viscosity of about 1000 mPa.s and a reduction of volume of 15%. This reduction of volume can be ascribed to the incorporation of air in the mixture, that is foaming.

After storing the CWM obtained for 1 month the tall oil pitch based sample has a soft sediment which can be homogenized by simple stirring with a spatula, while the fatty acid based samples cannot be homogenized in this way.

I claim:

1. A coal-water dispersion comprising coal particles dispersed in water and a dispersing agent in an amount of 0.1–5% by weight of the dispersion, wherein the dispersing agent is a tall oil pitch partially esterified with a polyalkylene glycol compound mainly being composed of ethylene oxide units, and having an average molecular weight of above 600, said dispersing agent having a residual acid value higher than 3.

2. A coal-water dispersion of claim 1, wherein the tall oil pitch has been polymerized before being esterified.

3. A coal-water dispersion of claim 1, wherein the polyalkylene glycol compound is an alkyl monoether of a polyalkylene glycol, the alkyl group having 1–5 carbon atoms.

4. A coal-water dispersion of claim 1, wherein the polyalkylene glycol compound is a monoester of a polyalkylene glycol, and a carboxylic acid R—COOH, wherein R is a hydrocarbon radical having 1–4 carbon atoms.

5. A coal-water dispersion of claim 1, wherein the polyalkylene glycol compound has an average molecular weight of from 4,000 to 14,000.

6. A coal-water dispersion of claim 1, wherein the polyalkylene glycol compound is polyethylene glycol.

7. A coal-water dispersion of claim 1, wherein the dispersing agent content is from 0.3 to 1% by weight of the dispersion.

8. A coal-water dispersion of claim 1 further comprising an additive to improve the stability of the dispersion.

9. A coal-water dispersion of claim 8, wherein said additive is xanthan gum.

10. A coal-water dispersion comprising coal particles dispersed in water and a dispersing agent in an amount of 0.1–5% by weight of the dispersion, wherein the dispersing agent is obtained by heating a polyalkylene glycol compound mainly being composed of ethylene oxide units and having an average molecular weight of above 600 together with preheated tall oil pitch at a temperature of 200°–285° C. for a sufficient length of time that the maximum acid value of the reaction mixture at this temperature has been reduced at least 2 units, said dispersing agent having a residual acid value higher than 3.

11. A coal-water dispersion of claim 10, wherein the tall oil pitch is polymerized before being heated with the polyalkylene glycol compound.

12. A method of dispersing coal particles in water comprising the steps:
    (a) mixing a dispersing agent comprising a tall oil pitch partially esterified with a polyalkylene glycol compound mainly being composed of ethylene oxide units and having an average molecular weight of above 600, said dispersing agent having a residual acid value higher than 3, with water of elevated temperatures,
    (b) adding the dispersing agent-water mixture to coal particles and mixing,
    (c) adding an additive to improve the stability of the dispersion to the coal-water dispersion and mixing.

13. The method of dispersing of claim 12, wherein the pH value of the dispersing agent-water mixture in step (a) is adjusted within the range 5–10.

14. The method of dispersing of claim 12, wherein the dispersing agent in step (a) is allowed to swell in water of about 80° C.

15. The method of dispersing of claim 12, wherein the additive in step (c) is xanthan gum.

* * * * *